United States Patent [19]
Sato et al.

[11] Patent Number: 5,974,284
[45] Date of Patent: Oct. 26, 1999

[54] IMAGE FORMING APPARATUS AND INITIALIZING METHOD THEREOF

[75] Inventors: Yumi Sato; Tetsuo Suzuki; Hiroko Iida; Yoshihiro Sekine, all of Kanagawa, Japan

[73] Assignee: Fuji Xerox Co., Ltd., Tokyo, Japan

[21] Appl. No.: 09/090,413

[22] Filed: Jun. 4, 1998

[30] Foreign Application Priority Data

Jun. 5, 1997 [JP] Japan .................................. 9-148130

[51] Int. Cl.⁶ ......................... G03G 21/14; G03G 15/00
[52] U.S. Cl. .................................. 399/76; 399/2; 399/85; 399/88; 358/401
[58] Field of Search ............................ 399/2, 8, 76, 81, 399/83, 85, 88; 358/401, 442, 468, 471; 395/835, 837, 838

[56] References Cited

U.S. PATENT DOCUMENTS

| | | | |
|---|---|---|---|
| 5,493,408 | 2/1996 | Kuogane et al. | 358/296 |
| 5,564,109 | 10/1996 | Snyder et al. | 395/836 X |
| 5,638,514 | 6/1997 | Yoshida et al. | 395/835 X |
| 5,717,950 | 2/1998 | Yamaguchi et al. | 395/835 X |
| 5,798,738 | 8/1998 | Yamada | 399/8 X |
| 5,819,107 | 10/1998 | Lichtman et al. | 395/835 X |
| 5,826,133 | 10/1998 | Saito et al. | 399/2 |

FOREIGN PATENT DOCUMENTS

| | | |
|---|---|---|
| 61-60313 | 4/1986 | Japan . |
| 62-2332 | 1/1987 | Japan . |

*Primary Examiner*—Matthew S. Smith
*Attorney, Agent, or Firm*—Finnegan, Henderson, Farabow, Garrett & Dunner, L.L.P.

[57] ABSTRACT

When a power supply of an image forming apparatus is turned on and also a power save function is released, the image forming apparatus initialize modules with respect to each of the modules. For example, when initializations of a communication control unit and a modulating/demodulating unit are accomplished, even when initializations of other modules are not yet ended, a facsimile service is provided. Also, when initializations of an image reading control unit and an image reading unit are accomplished, a scanner service is provided. In this manner, the services provided by such modules whose initializations have been accomplished are sequentially providable irrespective of states of the other modules.

17 Claims, 9 Drawing Sheets

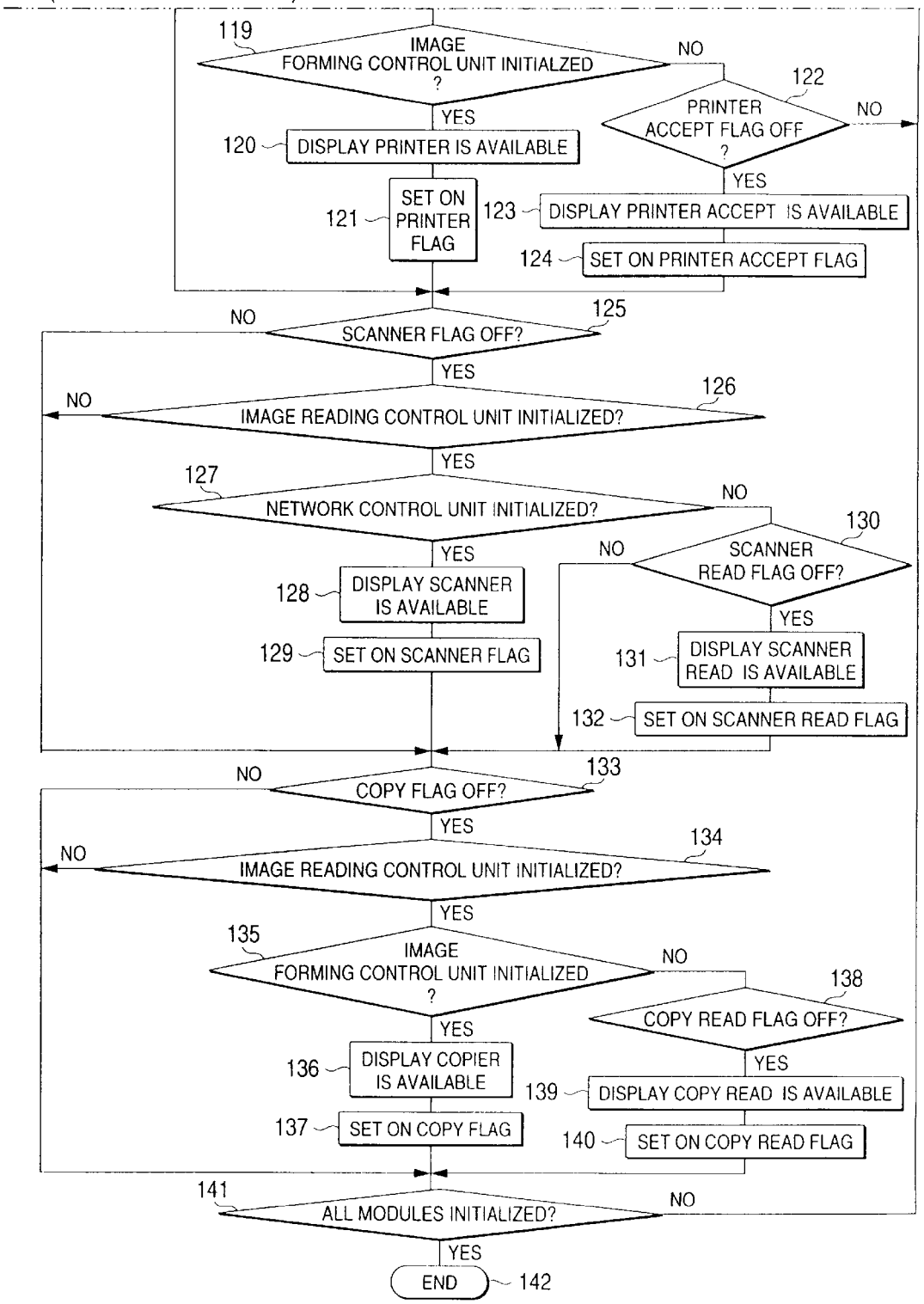

FIG. 3

| | COMMUNICATION CONTROL UNIT | NETWORK CONTROL UNIT | IMAGE READING CONTROL UNIT | IMAGE FORMING CONTROL UNIT |
|---|---|---|---|---|
| FACSIMILE SERVICE (COMPLETE) (SEND) (RECEIVE) | ○○○ | — — — | ○○ — — | ○ — — |
| PRINTER SERVICE (COMPLETE) (TRANSFER) | — — | ○○ ○ | — — | ○ — |
| SCANNER SERVICE (COMPLETE) (READ) | — — | — — | — ○○ | — — |
| COPY SERVICE (COMPLETE) (READ) | — — | — — | ○○ ○ | ○ — |

IMAGE FORMING APPARATUS AND INITIALIZING METHOD THEREOF

BACKGROUND OF THE INVENTION

1. Field of the Invention

The present invention relates to an image forming apparatus and an initializing method thereof. More specifically, the present invention is directed to an image forming apparatus and an initializing method thereof, capable of shortening transition time during which a state where a power supply is turned on is changed into an operable state, and a state where a power save mode is released is changed into to the operable state.

2. Description of the Related Art

Very recently, strong needs are made of conductions of power save functions in so-called "office automation appliances" such as copying machines, by which total power consumption may be reduced due to environmental aspects.

Several power saving techniques have been proposed in Japanese Utility Model Unexamined Publication No. Sho. 61-60313 and Japanese Utility Model Unexamined Publication No. Sho. 62-2332 . These conventional power saving techniques are realized in such a manner that while no operation is made by users, when preset time has passed, either a portion or all of the power supplies employed in the image forming apparatus are interrupted.

As to the power save sates by the power save function, there are the sleep mode, the off mode, and the low power mode. In the sleep mode, a portion of the power supplies used in the image forming apparatus is interrupted. In the off mode, all of the power supplies of the image forming apparatus are interrupted. In the low power mode, the power consumption is reduced in such a manner that the rotating speed of the motor is lowered, and the temperature of the heat source is decreased.

These power saving techniques may provide various merits to the users, for instance, power saving and low running cost. However, since the time required to release the power save state is prolonged and also the user friendly degrees are lowered in these power saving techniques, these difficulties may cause such a fact that users do not wish to use the sleep mode, the off mode, and the low power mode.

In these image forming apparatuses, when either the off mode or the sleep mode is changed into the operable state of these image forming apparatuses, the various process operations are carried out similar to those when the power supplies are turned on, e.g., the devices are initialized, and the system data are transferred. Also, when the low power mode of the image forming apparatuses is changed into the operable state, various process operations are performed, for instance, the rotating speed of the motor is increased, and the temperature of the heat source is increased.

As previously explained, the process operations executed when the respective power save states of the image forming apparatus are changed into the operable condition are different from each other, depending upon the contents of the power save states. It should be understood that these process operations will be referred to as "initializations" in this specification.

On the other hand, in an image forming apparatus (namely, composite apparatus) equipped with a plurality of functions such as a copying machine (copier), a facsimile, and a printer, sub-systems are formed in the form of modules. When a power supply of this composite apparatus is turned on, all of these modules are initialized. Also, when a power save state by a power save function is released, such modules set under power save states are initialized.

Since the time durations required to initialize these modules are different from each other depending upon the sorts of modules, a portion of services can be provided in the stages until all of the modules have been initialized. For example, although a copy service cannot be provided, a facsimile service can be provided. Although a so-called "sequential copy" service cannot be provided, a so-termed "previous reading copy" service can be provided in copy services. In this "sequential copy" service, both a scanning operation and a printing operation are carried out at the same time, whereas in the "previous reading copy" service, only a scanning operation is previously carried out.

However, in the conventional image forming apparatus, since all of the services are not providable until the initializations of all of the modules are completed, when the power save technique is conducted, the user friendly degree is lowered.

As previously described, in the conventional image forming apparatus, since no services are provided until the initializations of all of the sub-systems are accomplished, the services cannot be provided for such a time period required to initialize all of the modules when the power supply is turned on, and the power save state by the power save function is released. As a result, the user friendly degrees are lowered, which may cause that the users do not use the power save function.

SUMMARY OF THE INVENTION

Therefore, the present invention has an object to provide an image forming apparatus and an initializing method thereof, capable of shortening time required for an initialization, and also capable of suppressing a decrease of a user friendly degree.

To achieve the above-described object, the present invention provides an image forming apparatus provided with a plurality of modules having different functions, for providing a plurality of services by utilizing at least one of the plurality of modules, the image forming apparatus comprising: initializing means for initializing the modules with respect to each of the modules; and managing means for managing the modules and the services in correspondence with each other, wherein the initializing means initializes the modules every module, corresponding to the services managed by the managing means.

Further, the invention provides an image forming apparatus provided with a plurality of modules having different functions, and power saving means for interrupting a power supply of at least one of the plurality of modules or for reducing a power supply amount of the power supply, a service being provided by utilizing at least one of the plurality of modules, the image forming apparatus comprising: sensing means for sensing such a module brought into a power saving state by the power saving means among the plurality of modules; and managing means for managing the modules and the services in correspondence with each other, wherein even when a portion of the modules corresponding to the services managed by the managing means is brought into the power saving state by the power saving means, the services can be provided.

Further, the invention provides a method for initializing an image forming apparatus provided with a plurality of modules having different functions, for providing a plurality of services by utilizing at least one of the plurality of modules, the method comprising the steps of: initializing the modules with respect to each of the modules, and also causing the modules to correspond to the services; and initializing the modules corresponding to the services with respect to each of the modules.

Further, the invention provides a method for initializing an image forming apparatus provided with a plurality of modules having different functions, and power saving means for interrupting a power supply of at least one of the plurality of modules, or for reducing a power supply amount of the power supply, a service being provided by utilizing at least one of the plurality of modules, the method comprising the steps of: sensing such a module brought into a power saving state by the power saving means among the plurality of modules; and causing the plurality of modules and the plurality of services in correspondence with each other, wherein even when a portion of the modules corresponding to the services managed by the managing means is brought into the power saving state by the power saving means, the services can be provided.

Further, the invention provides a medium for recording therein an initializing program of an image forming apparatus provided with a plurality of modules having different functions, for providing a plurality of services by utilizing at least one of the plurality of modules, wherein the modules are initialized with respect to each of the modules, the modules are caused to correspond to the services, and the modules are initialized every module, corresponding to the services.

Further, the invention provides a medium for recording therein an initializing program of an image forming apparatus provided with a plurality of modules having different functions, and power saving means for interrupting a power supply of at least one of the plurality of modules, or for reducing a power supply amount of the power supply, a service being provided by utilizing at least one of the plurality of modules, wherein such a module brought into a power saving state by the power saving means is sensed among the plurality of modules, the modules are caused to correspond to the services, and even when a portion of the modules corresponding to the services is brought into the power saving state by the power saving means, the services can be provided.

BRIEF DESCRIPTION OF THE DRAWINGS

FIG. 3 is a table illustrating a correspondence relationship between the respective control units and the services to be provided.

DETAILED DESCRIPTION OF THE PREFERRED EMBODIMENT

An image forming apparatus and an initializing method thereof, according to an embodiment of the present invention, will now be described in detail with reference to the accompanying drawings.

Figure 1:
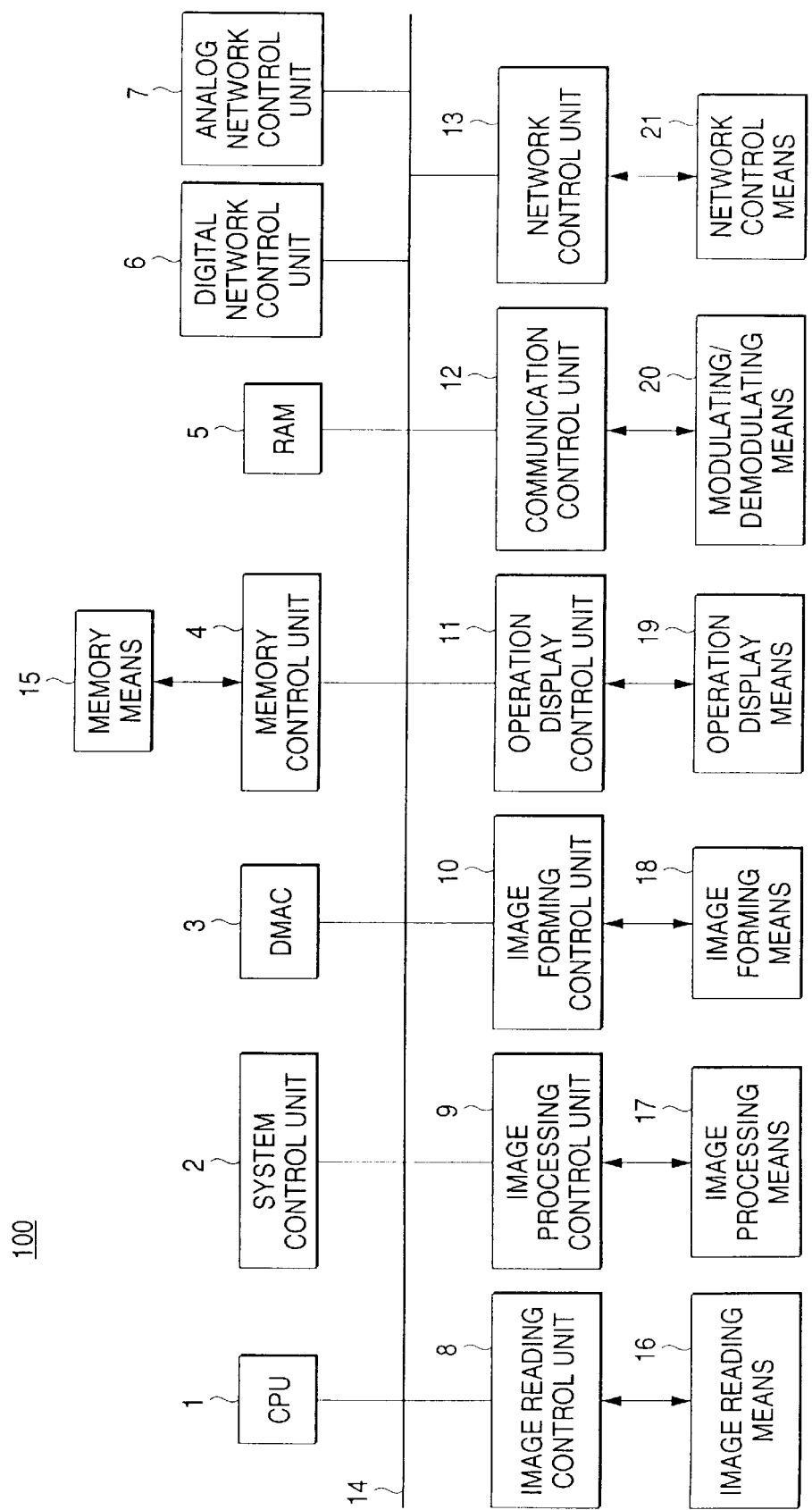
FIG. 1 is a block diagram for indicating a composite apparatus with employment of an image forming apparatus and an initializing method thereof, according to an embodiment of the present invention.

FIG. 1 is a schematic block diagram for representing an arrangement of a composite apparatus with employment of an image forming apparatus and an initializing method thereof, according to an embodiment of the present invention.

In FIG. 1, a composite apparatus 100 is arranged by a central processing unit (CPU) 1, a system control unit 2, a direct memory access controller (DMAC) 3, a memory control unit 4, a random access memory (RAM) 5, a digital network control unit 6, and an analog network control unit 7. This composite apparatus 100 is further arranged by an image reading control unit 8, an image processing control unit 9, an image forming control unit 10, an operation display control unit 11, a communication control unit 12, a network control unit 13, a system bus 14, memory means 15, image reading means 16, image processing means 17, image forming means 18, operation display means 19, modulating/demodulating means 20, and network control means 21.

Then, the CPU 1 corresponds to a central processing unit, and the system control unit 2 controls an overall system of this composite apparatus 100. The DMAC 3 controls a data transfer operation, the memory control unit 4 controls the memory means 15 for storing image (picture) data, destination information, and the like, and further the RAM 5 is used as a work memory region capable of temporarily storing a control software, image data, and the like, or used as an expand buffer for storing dial information.

Also, the digital network control unit 6 is a device used to be connected to a digital network, and the analog network control unit 7 is a device used to be connected to an analog public network. The image reading control unit 8 controls the image reading means 16 for reading the image data, and the image processing control unit 9 controls the image processing means 17 for executing editing operations and processing operations, for instance, coding/decoding, enlarging/reducing, and compressing/expanding of the image data.

The image forming control unit 10 controls the image forming means 18 for marking the image data, and the operation display control unit 11 controls the operation display means 19 including an input device such as a keyboard and a touch panel, and also a display device such as a light emitting diode (LED) and a liquid crystal display (LCD) unit.

The communication control unit 12 controls the modulating/demodulating means 20 connected to either the digital network or the analog network. The network control unit 13 controls the network control means 21 for connecting a plurality of internal communication circuits to a network.

The respective control units are connected via the system bus 14, and transmit/receive signals via this system bus 14.

When this composite apparatus 100 may satisfy a predetermined condition, for instance, such a condition that this composite apparatus 100 is not used by a user for a predetermined time duration, a power saving function is actuated, so that the operation state of this composite apparatus 100 is transferred to a power save state. When the composite apparatus 100 is recovered from this power save state, or the power supply thereof is turned on, the structural units set under the power save state, or all of the structural units of this composite apparatus 100 are initialized.

Figure 2:
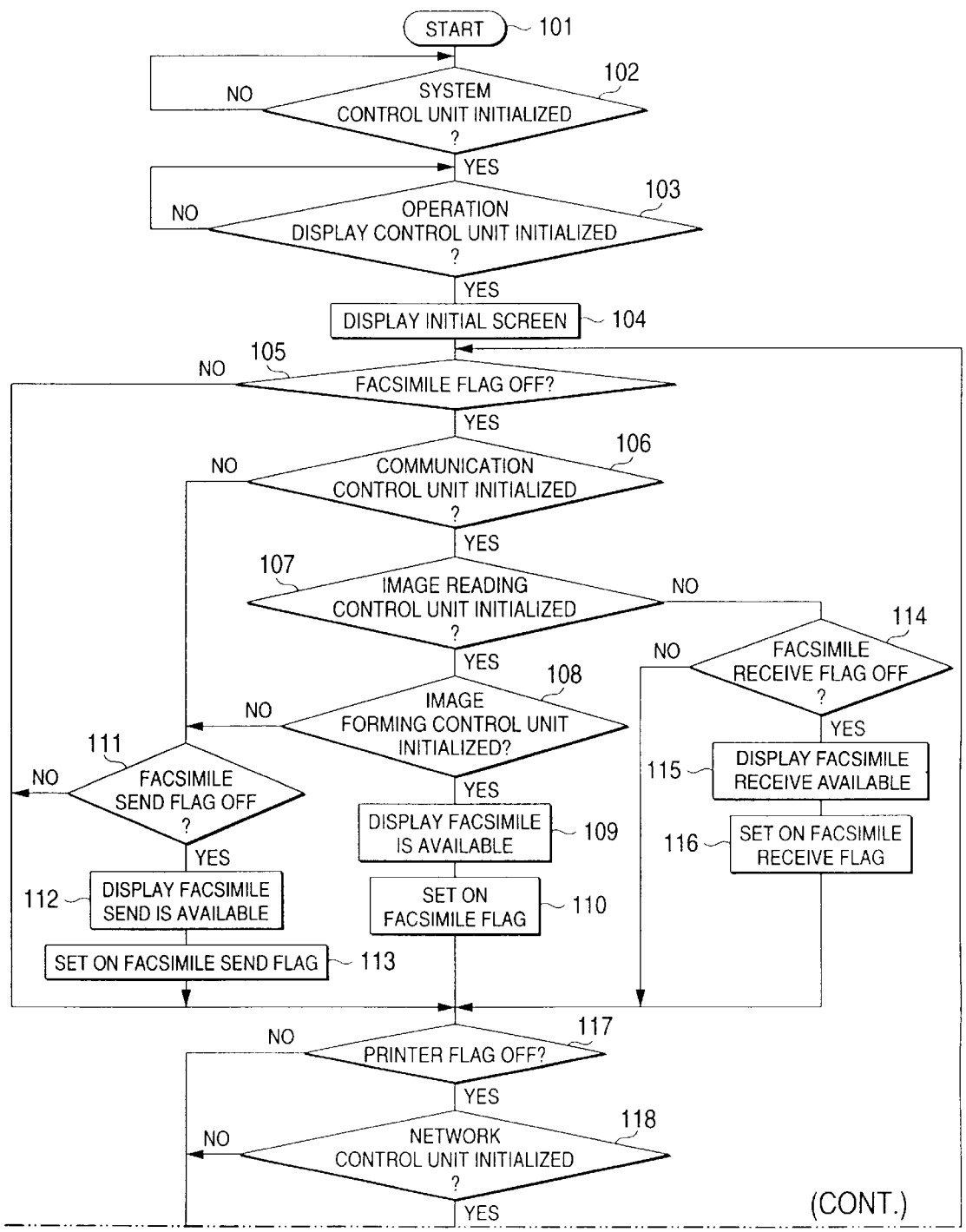
FIG. 2 is a flow chart for describing a process flow operation defined after the composite apparatus starts an initialization until the composite apparatus commences provisions of all of services.

In FIG. 2, there is shown a flow chart for describing process flow operations after the composite apparatus 100 commences the initialization until this composite apparatus 100 starts to provide all services. FIG. 3 illustratively indicates a correspondence relationship between the respective control units and the respective services to be provided.

In the flow chart of FIG. 2, when the composite apparatus 100 commences the initialization (step 101), the initialization of the system control unit 2 is accomplished (YES in step 102), and also the initialization of the operation display control unit 11 is completed (YES in step 103), an initial image is displayed on the display device of the operation display means 19 (step 104).

Next, the composite apparatus 100 will provide the respective services of a facsimile, a printer, a scanner, and a copier in the order of completions of the initializations.

As indicated in FIG. 3, each of these facsimile service, printer service, scanner service, and copier service may be provided when the initializations of the respective control units are accomplished. As to the facsimile service, when the initializations of both the communication control unit 12 and the image reading control unit 8 are completed, only a facsimile send service is providable; when the initializations of the communication control unit 12 and the image forming control unit 10 are completed, only a facsimile receive service is providable; and when the initializations of the communication control unit 12, the image reading control unit 8, and the image forming control unit 10 are completed, a complete facsimile service is providable.

Also, when the initialization of the network control unit 13 is completed, the printer can transfer print data from a terminal (not shown) to the composite apparatus 100. Furthermore, when the initialization of the image forming control unit 10 is completed, a complete service can be provided.

When the initialization of the image reading control unit 8 is completed, the scanner can read the image. Moreover, when the initialization of the network control unit 13 is completed, a complete service can be provided. When the initialization of the image reading control unit 8 is completed, the copier can read the image. Furthermore, when the initialization of the image forming control unit 10 is completed, a complete service can be provided.

It should be noted in this description that the editing operations and the processing operations such as the coding/decoding, enlarging/reducing and compressing/expanding of the image data by the image processing control unit 9 are omitted.

Then, when the initial screen is displayed by the operation display means 19 in step 104, a check is made as to whether or not a facsimile flag is set to OFF (step 105). In such a case that the facsimile flag is set to OFF (YES in step 105), if the initializations of all of the communication control unit 12, the image reading control unit 8, and the image forming control unit 10 are accomplished (YES in step 106, YES in step 107, and YES in step 108), then the operation display means 19 displays that the facsimile can be used (step 109), and sets the facsimile flag to ON (step 110). Then, the process operation is advanced to the next process operation (step 117).

When the initialization of the image forming control unit 10 is not accomplished in step 108 (NO in step 108), a check is made as to whether or not a facsimile send flag is set to OFF (step 111). In such a case that the facsimile send flag is set to OFF (YES in step 111), the operation display means 19 displays that the facsimile can be used only in the send mode (step 112), and sets the facsimile send flag to ON (step 113). Then, the process operation is advanced to the next process operation (step 117).

Furthermore, when the initialization of the image reading control unit 8 is not accomplished in step 107 (NO in step 107), a check is made as to whether or not a facsimile receiver flag is set to OFF (step 114). If this facsimile receive flag is set to OFF (YES in step 114), then the operation display means 19 displays that the facsimile can be used only in the receive mode (step 115), and sets this facsimile receive flag to ON (step 116). Then, the process operation is advanced to the next process operation (step 117).

When the facsimile flag is set to ON (NO in step 105); when the initialization of the communication control unit 12 is not yet completed (NO in step 106); when the facsimile send flag is set to ON (NO in step 111); and when the facsimile receive flag is set to ON (NO in step 114), the process operation is advance to a further process operation (step 117).

Next, a check is made as to whether or not a printer flag is set to OFF (step 117). In such a case that the printer flag is set to OFF (YES in step 117), if the initializations of the network control unit 13 and the image forming control unit are accomplished (YES in step 118, and YES in step 119), then the operation display means 19 displays that the printer can be used (step 120), and sets the printer flag to ON (step 121). Then, the process operation is advanced to a next process operation (step 125).

To the contrary, when the initialization of the image forming control unit 10 is not completed in step 119 (NO in step 119), another check is made as to whether or not a printer accept flag is set to OFF (step 122). If the printer accept flag is set to OFF (YES in step 122), then the operation display means 19 displays that the printer can be used only in a printer accept mode (step 123), and sets the printer accept flag to ON (step 124). Then, the process operation is advanced to the next process operation (step 125).

On the other hand, when the printer flag is set to ON (NO in step 117); when the initialization of the network control unit 13 is not yet completed (NO in step 118); and when the printer accept flag is set to ON (NO in step 122), the process operation is advanced to a further process operation (step 125).

Next, a check is made as to whether or not a scanner flag is set to OFF (step 125). In such a case that the scanner flag is set to OFF (YES in step 125), if the initializations of the image reading control unit 8 and the network control unit 13 are accomplished (YES in step 126, and YES in step 127), then the operation display means 19 displays that the scanner can be used (step 128), and sets the scanner flag to ON (step 129). Then, the process operation is advanced to a next process operation (step 133).

To the contrary, when the initialization of the network control unit 13 is not completed in step 127 (NO in step 127), another check is made as to whether or not a scanner read flag is set to OFF (step 130). If the scanner read flag is set to OFF (YES in step 130), then the operation display means 19 displays that the scanner can be used only in an image read mode (step 131), and sets the scanner read flag to ON (step 132). Then, the process operation is advanced to the next process operation (step 133). It should be noted that although the scanner can be operated only in the image read mode, the data transfer via the network is not available.

When the scanner flag is set to ON (NO in step 125); when the initialization of the image reading control unit 8 is not yet completed (NO in step 126); and when the scanner read flag is set to ON (NO in step 130), the process operation is advanced to a further process operation (step 133).

Next, a check is made as to whether or not a copy flag is set to OFF (step 133). In such a case that the copy flag is set to OFF (YES in step 133), if the initializations of the image reading control unit 8 and the image forming control unit are accomplished (YES in step 134, and YES in step 135), then the operation display means 19 displays that the printer can be used (step 136), and sets the copy flag to ON (step 137). Then, the process operation is advanced to a next process operation (step 141).

To the contrary, when the initialization of the image forming control unit 10 is not completed in step 135 (NO in step 135), another check is made as to whether or not a copy read flag is set to OFF (step 138). If the copy read flag is set to OFF (YES in step 138), then the operation display means 19 displays that the copier can be used only in an image read mode (step 139), and sets the image read flag to ON (step 140). Then, the process operation is advanced to the next process operation (step 141).

When the copy flag is set to ON (NO in step 133); when the initialization of the image reading control unit 8 is not yet completed (NO in step 134); and when the copy read flag is set to ON (NO in step 138), the process operation is advanced to a further process operation (step 141).

Then, the process operations defined in step 105 to step 141 are repeated until the initializations of all of the modules are accomplished and all of the services can be provided (NO in step 141). At this time, since the flag of the service which has been started to be provided is set to ON, the same process operation is not repeated.

When the initializations of all of the modules are accomplished (YES in step 141), the composite apparatus 100 commences the provisions of all of the services, and then the initialization process operation is ended (step 142).

Figure 4:
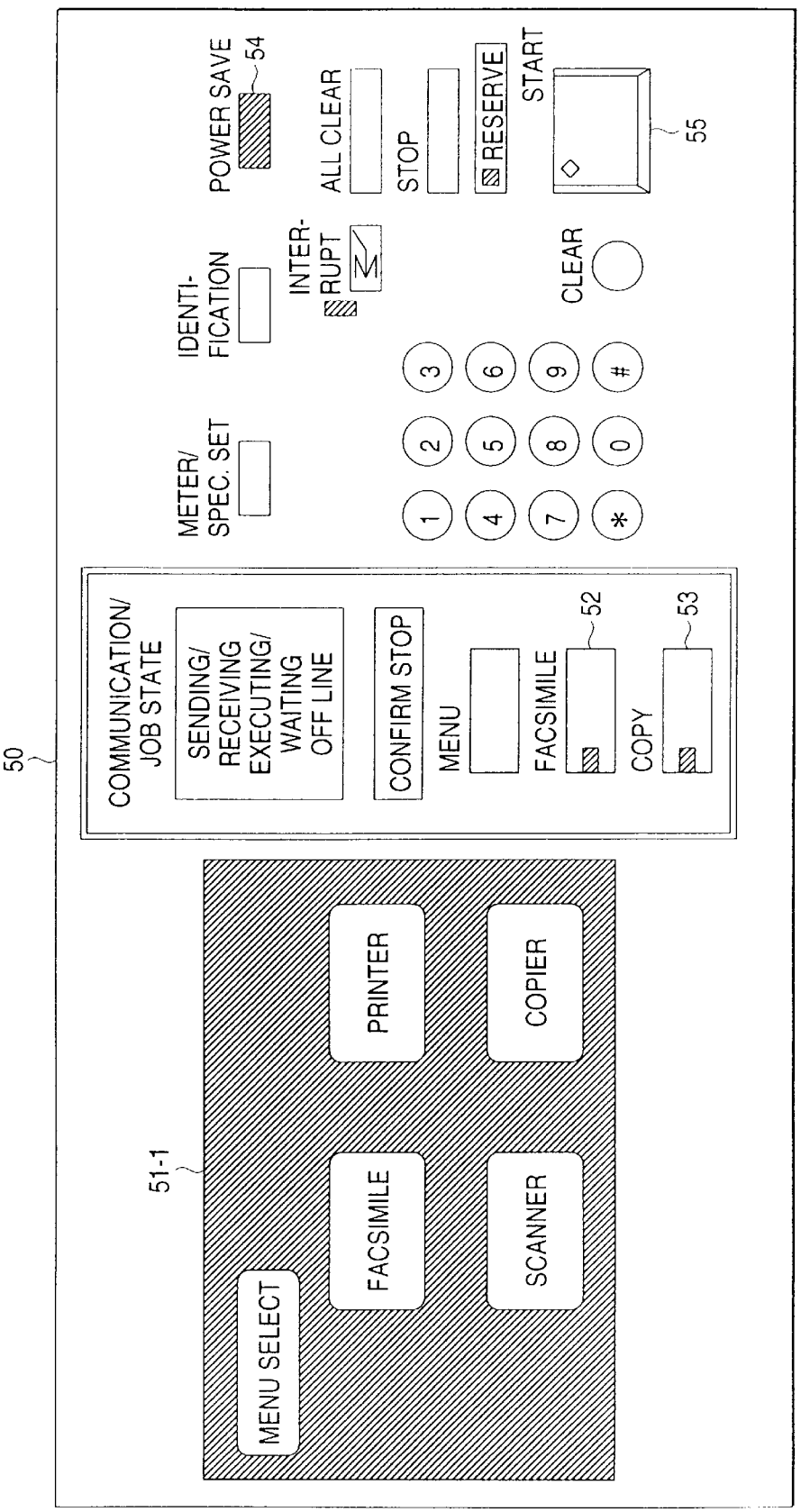
FIG. 4 is a view illustrating an example (all of services are providable) of a control panel.
Figure 5:
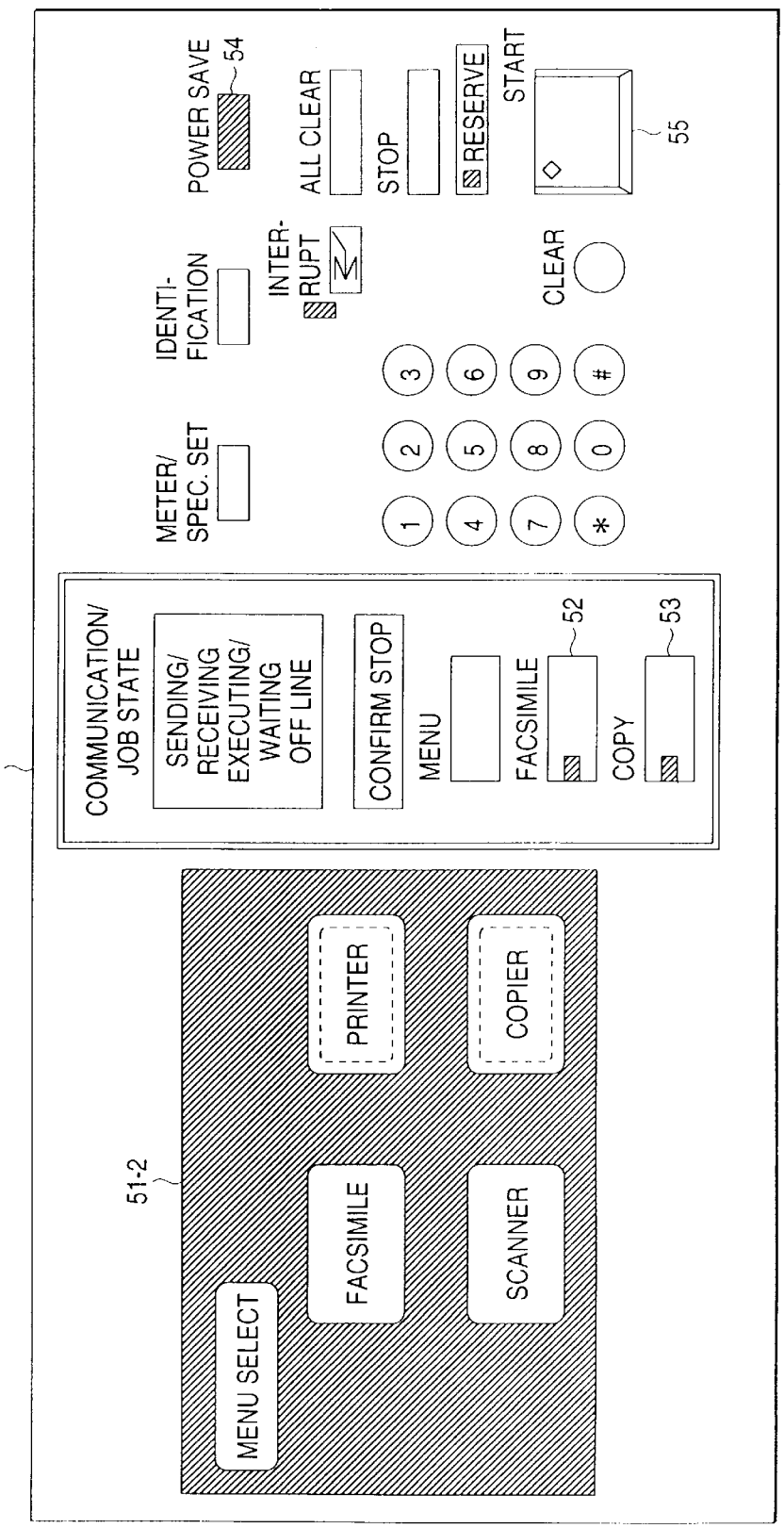
FIG. 5 is a view illustrating another example (a portional module is under initialization) of the control panel.
Figure 6:
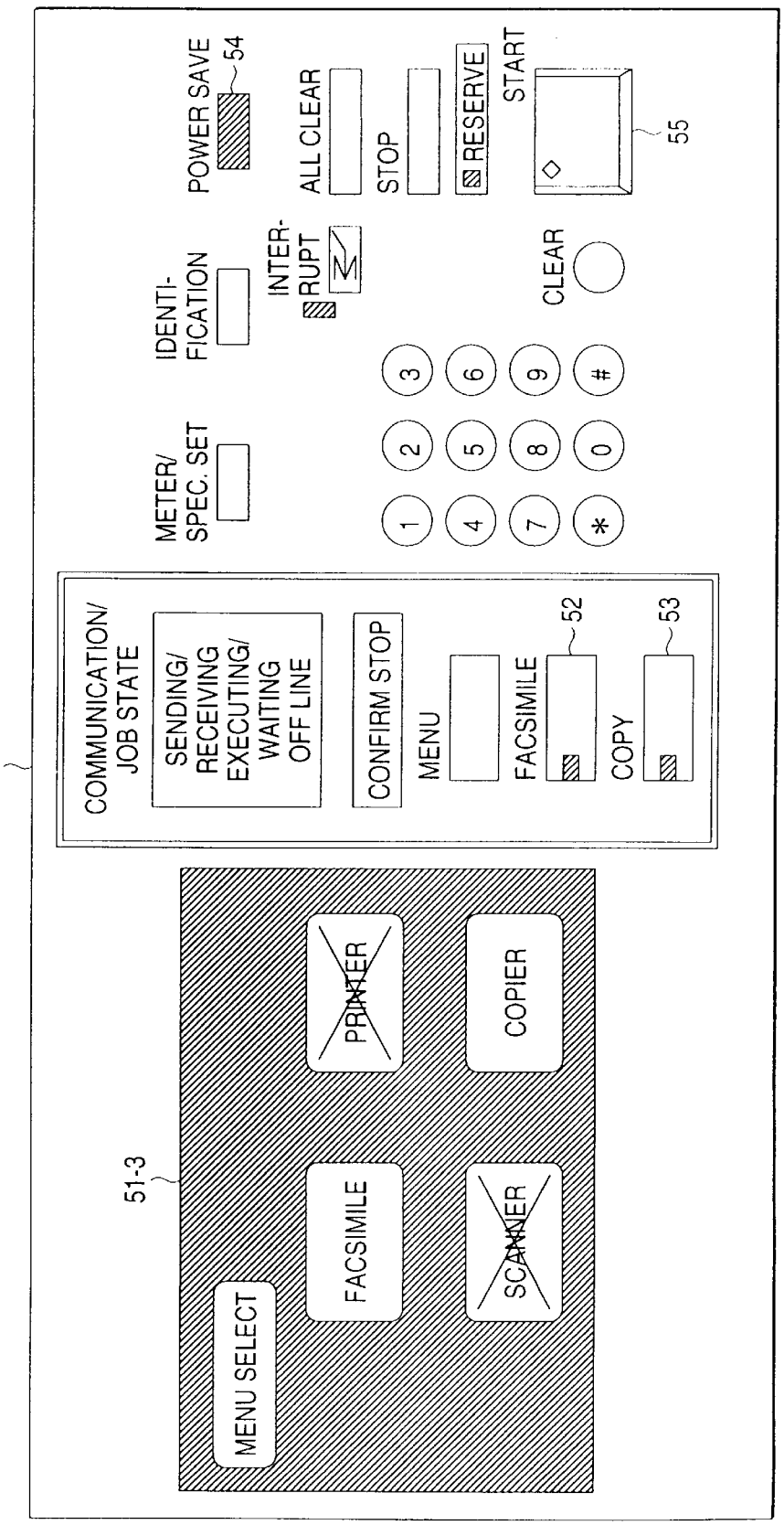
FIG. 6 is a view illustrating another example (a portional module fails in initialization thereof) of the control panel.

FIGS. 4 to 6 illustrate an example of a control panel corresponding to a portion of the above-described display means 19.

The control panel 50 is equipped with an LCD 51 (namely, LCD 51-1 to LCD 51-3), a facsimile button 52, a copy button 53, a power save button 54, and a start button 55.

The LCD 51-1 shown in FIG. 4 displays such a case that the initializations of all of the modules are accomplished, and thus, all of the services can be provided. In this manner, when all of the services are available, the LED of the facsimile button 52 and the LED of the copy button 53 are turned on in addition to the display of the LCD 51-1.

The LCD 51-2 shown in FIG. 5 displays such a case that the image forming control unit 10 is under initialization, and the initializations of other modules are ended. In this case, since both the image forming control unit 10 and the image forming means 18 cannot be used, both the services of the printer and the copier are not providable. As a consequence, the LCD 51-2 represents that by flickering both a printer icon and a copier icon, both the printer and the copier are under initialization. Also, the LED of the copy button 53 is flickered.

The LCD 51-3 shown in FIG. 6 displays such a case that the initialization of the network control unit 13 fails. In this case, since both the network control unit 13 and the network control means 21 cannot be used, the services of the printer and the scanner are not providable. However, since the composite apparatus 100 sequentially initializes the respective modules, and then sequentially provides the available services, even when there is such a service which could not be initialized, other services are providable. Under such a circumstance, both the providable services and the non-providable services are displayed in a different manner.

Next, the operation of the composite apparatus 100 when a portion of the services is provided will now be explained by using a copy service as an example.

Figure 7:
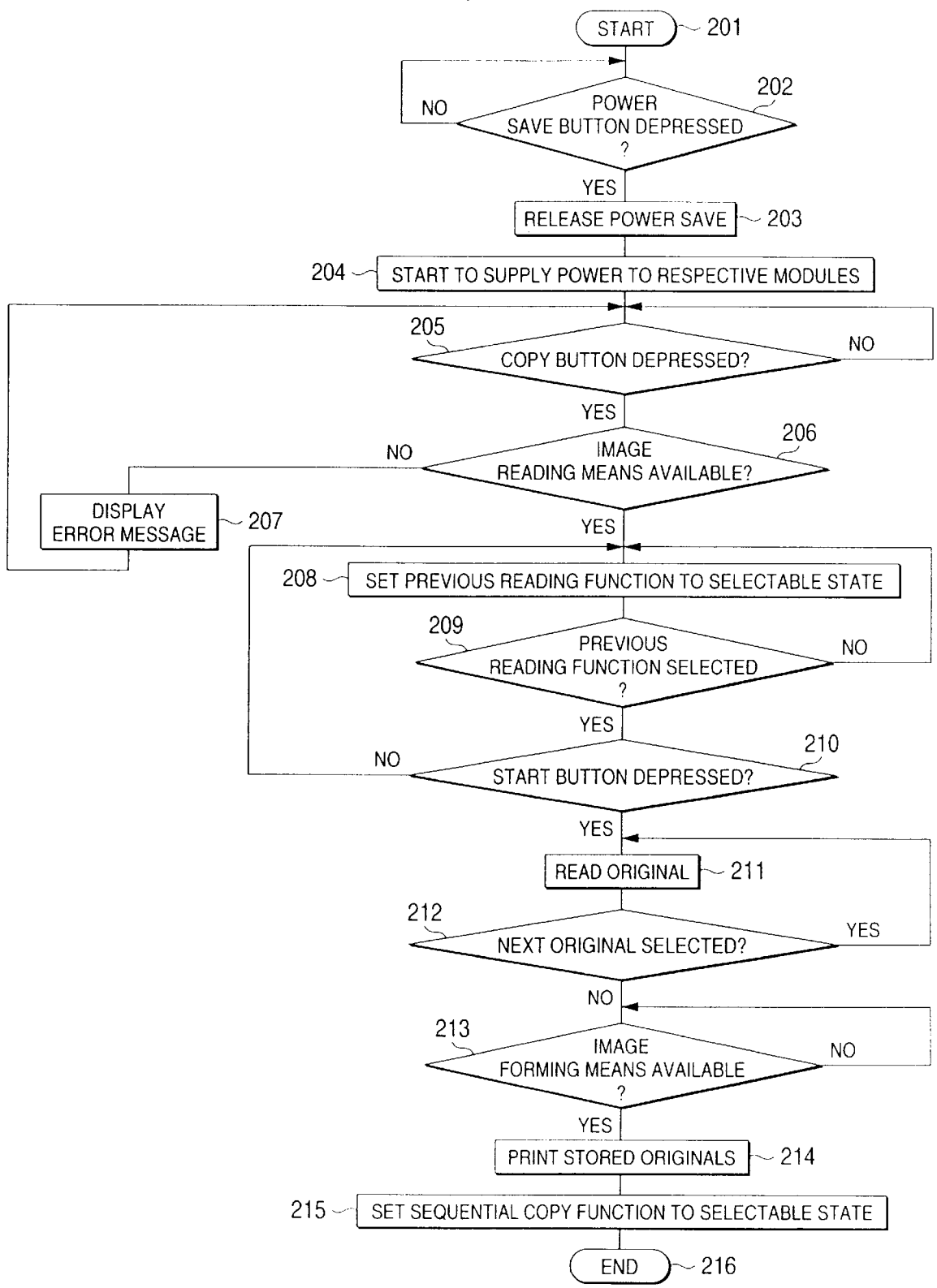
FIG. 7 is a flow chart for describing a process flow operation of the composite apparatus, defined after the composite apparatus is under power save state by a power save function until a copy service is provided by releasing the power save function by the user.

FIG. 7 is a flow chart for describing an operation flow of the composite apparatus 100 operated from a power save state by a power save function until the copy service is provided by releasing the power save function. It is now assumed that both the image reading means 16 and the image forming means 18 are brought to the power save states.

Until the power save button 54 is depressed, the composite apparatus 100 operated under power save state (step 201) maintains this power save state (NO in step 202). When the power save button 54 is depressed (YES in step 202), the power save function is released (step 203), and thus the supplies of power to the respective modules are commenced (step 204).

In this case, when the copy button 53 is depressed (YES in step 205), a check is made as to whether or not the image reading means 16 can be used (step 206). If the image reading means 16 cannot be used (NO in step 206), then an error message is displayed on the operation display means 19 (step 207), and the composite apparatus 100 is brought into a waiting state until the copy button 53 is again depressed (NO in step 205).

On the other hand, when the image reading means 16 can be used in step 206 (YES in step 206), a "previous reading" function is set to a selectable state (step 208).

When the previous reading function is selected by the user (YES in step 209), and the start button 55 is depressed (YES in step 210), an original is read by the image reading means 16 and the read original is stored in the memory means 15 (step 211).

Subsequently, when a "next original" function is selected by the user (YES in step 212), the original is subsequently read, and the read original is stored into the memory means 15 (step 211). Conversely, when the next original function is not selected (NO in step 212), the process operation is advanced to a further process operation (step 213).

Next, a check is made as to whether or not the image forming means 18 can be used (step 213). If the image forming means 18 can be used (YES in step 213), then the stored originals are printed out (step 214).

When all of the stored originals are printed out, the composite apparatus 100 sets a "sequential copy" function to a selectable state (step 215), and accomplishes the release process operation of the power saving condition (step 216).

On the other hand, since the composite apparatus 100 executes the initializations of the modules every module and can provide the services corresponding to the initialized modules, in such a case that the composite apparatus 100 is set under the power save state, the composite apparatus 100 initializes only the modules corresponding to the services required by the user to thereby provide the services of these initialized modules. As a consequence, the power consumption by executing the unnecessary initializing operations can be suppressed.

Figure 8:
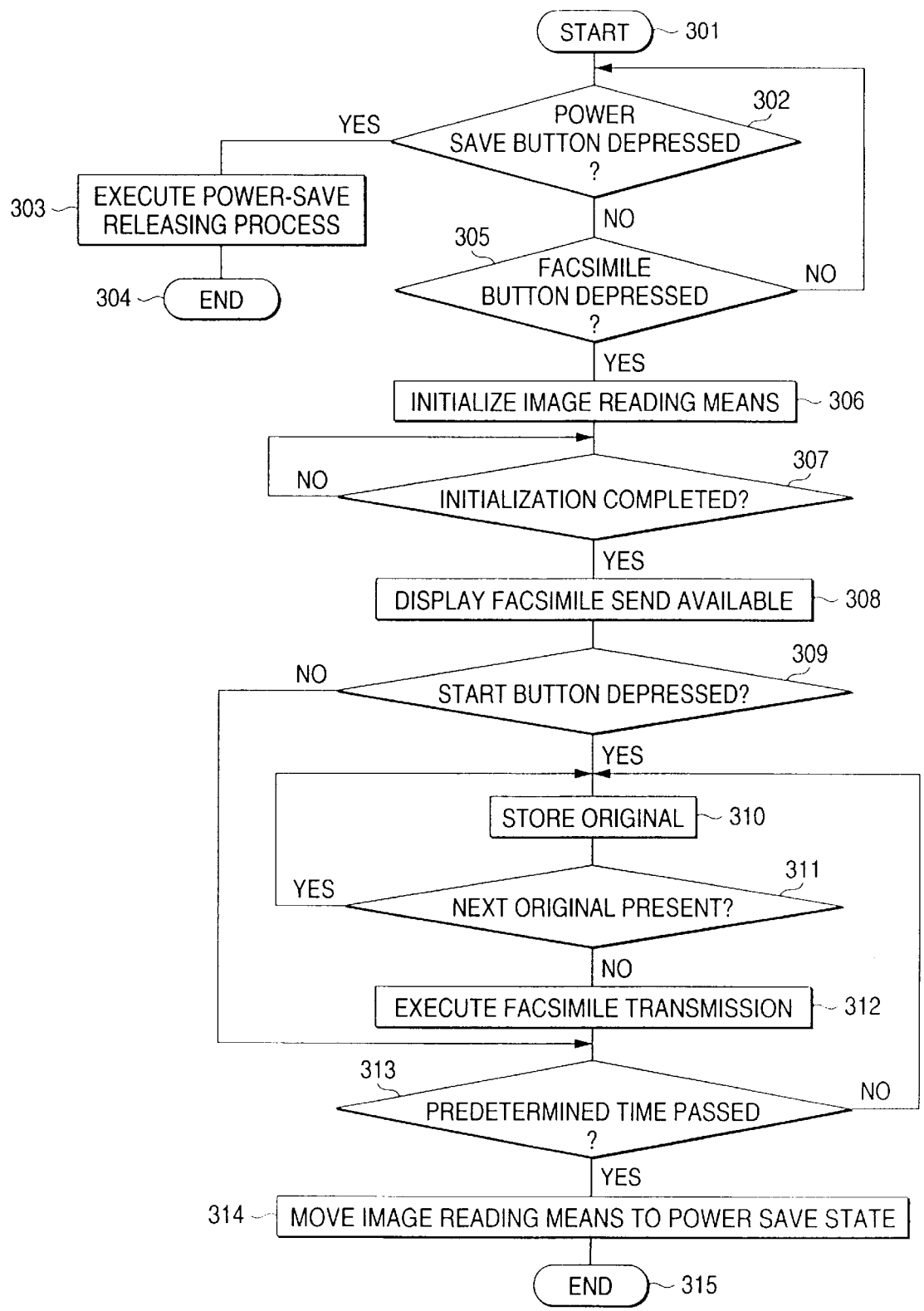
FIG. 8 is a flow chart for describing a process flow operation of the composite apparatus, defined after the composite apparatus is under power save state by a power save function until a facsimile service is provided by selecting a facsimile service operation by the user.

FIG. 8 is a flow chart for describing a process flow operation defined in the power save state of the composite apparatus 100 by the power save function until the facsimile service is started to be provided by selecting the facsimile service by the user. It is now assumed that the image reading means 16 is set under the power save state.

Now, while the composite apparatus 100 is set under the power save state (step 301), when the power save button 54 is depressed (YES in step 302), the normal release process operation of the power save function is carried out (step 303). Then, the composite apparatus 100 commences the provision of all of the services (step 304).

On the other hand, while the composite apparatus 100 is set under the power save state (step 301), if the power save button 54 is not depressed (NO in step 302), but the facsimile button 52 is depressed (YES in step 305), then the composite apparatus 100 starts to initialize only such a module required to provide the facsimile service by the image reading control unit 8 and the image reading means 16 (step 306).

When the initialization is accomplished (YES in step 307), the operation display means 19 displays such a message that a facsimile send service is providable (step 308).

Now, if the start button 55 is depressed by the user (YES in step 309), then an original is read by the image reading means 16 and the read original is stored into the memory means 15 (step 310).

This original storage operation is continuously carried out until all of the originals are stored into the memory means (YES in step 311). When the original storage operation for all of the originals are completed (NO in step 311), a facsimile send process operation is performed (step 312).

When the facsimile send process operation is completed, the composite apparatus 100 is brought into a waiting state until predetermined time has passed (NO in step 313). If the predetermined time has passed (YES in step 313), then the composite apparatus 100 again brings the image reading means 16 to the power save state by the power saving function (step 314), and then accomplishes the process operation (step 315).

Also, after such a message has been displayed that the facsimile send service is available (step 308), if the start button 55 is not depressed by the user (NO in step 309), the composite apparatus 100 is brought into a waiting state until predetermined time has passed (NO in step 313). If the predetermined time has passed (YES in step 313), then the composite apparatus 100 again brings the image reading means 16 to the power save state by the power saving function (step 314), and then accomplishes the process operation (step 315).

It should be understood that the respective units employed in the composite apparatus 100 according to this embodiment are controlled by both the CPU 1 and the system control unit 2. Alternatively, these operations may be carried out based on a control program. In this alternative case, the control program recorded on a recording medium is installed.

As previously described, according to the present invention, when the power supply of the image forming apparatus is turned on, and also the power saving function thereof is released, the respective modules for constituting the image forming apparatus are initialized with respect to each of the modules, and the services corresponding to such modules whose initializations have been accomplished are sequentially provided. As a consequence, the time required to execute the initializations can be shortened, and thus the user friendly degrees can be improved.

Also, since the service whose initialization is completed, the service whose initialization is being carried out, and the service whose initialization fails are discriminatively displayed, the user friendly degrees can be further improved.

Furthermore, when the image forming apparatus is set under the power save state, only the module corresponding to the service designated by the user is initialized. As a consequence, the time required to perform the initialization can be shortened, and also the power saving effect achieved by the power save function can be further improved.

What is claimed is:

1. An image forming apparatus comprising:

a plurality of modules;

a plurality of services, each of said services utilizing at least one of the modules;

initializing means for initializing the modules; and managing means for managing the modules and the services in correspondence with each other, wherein each of said services becomes available to a user as said at least one of the modules become initialized.

2. The image forming apparatus as claimed in claim 1, further comprising:

display means for displaying information relating to the availability of each of said services.

3. The image forming apparatus as claimed in claim 2, further comprising: sensing means for sensing a module which could not be initialized by said initializing means, wherein said display means discriminatively displays a service corresponding to the module whose initialization is completed, a service corresponding to the module sensed by said sensing means, whose initialization could not be performed, and also a service corresponding to the module which is under initialization by said initializing means.

4. The image forming apparatus as claimed in claim 1, further comprising: service designating means for designating a predetermined service from the plurality of services; and comparing means for comparing the service designated by said service designating means with the service providable after the initialization is completed, wherein when an initialization of the service designated by said service designating means is completed, it is so judged that the initialization by said initializing means is completed.

5. An image forming apparatus provided with a plurality of modules having different functions, and power saving means for interrupting a power supply of at least one of the plurality of modules or for reducing a power supply amount of the power supply, a service being provided by utilizing at least one of the plurality of modules, said image forming apparatus comprising:

sensing means for sensing such a module brought into a power saving state by said power saving means among the plurality of modules; and managing means for managing the modules and the services in correspondence with each other, wherein even when a portion of the modules corresponding to the services managed by said managing means is brought into the power saving state by said power saving means, the services can be provided.

6. The image forming apparatus as claimed in claim 5, further comprising: display means for discriminatively displaying such a case that while the portion of the modules is brought into the power saving state by said power saving means, the service corresponding to the module is provided, and such a case that while all of the modules are energized without operating said power saving means, the services corresponding to the modules are provided.

7. The image forming apparatus as claimed in claim 5, further comprising: initializing means for selectively initializing only the module corresponding to the service used by a user under such a condition that the power supplies of all of the modules are interrupted, or the power supply amounts thereof are reduced by said power saving means.

8. A method for initializing an image forming apparatus provided with a plurality of modules and a plurality of services, wherein each of said plurality of services utilizes at least one of said modules, said method comprising the steps of:

starting the initialization of each of the modules; and making a service available when the modules utilized by said service become initialized.

9. The method as claimed in claim 8, wherein such a service available after the initialization of the module is completed, and such a service not available while the initialization of the module is not completed, are discriminatively displayed.

10. The method as claimed in claim 9, wherein a service corresponding to the module whose initialization is completed, a service corresponding to the module, whose initialization could not be performed, and also a service which is under initialization, are discriminatively displayed.

11. The method as claimed in claim 8, wherein when an initialization of a module corresponding to a service previously designated among the plurality of services is completed, it is so judged that an initialization by a system is completed.

12. A method for initializing an image forming apparatus comprising a plurality of modules in a power saving state, said apparatus providing a plurality of services, each of said services comprising a sequence of at least one process step, each of said at least one process steps utilizing at least one of said modules, said method comprising the steps of:

starting the initialization of each of the modules from the power save state to an available state;

as a module reaches the available state, determining which of said process steps of said services utilizes said module;

making a process step of a service available if said at least one module utilized by said process step is in an available state and if no process step earlier in said sequence is unavailable.

13. The method as claimed in claim 12, including displaying information relating to those of said services that are unavailable, those of said services having all of said process steps of said service available, and those of said services having less than all of said process steps of said service available.

14. A method of initializing an image forming apparatus from a power save state, said apparatus comprising a plurality of modules, said apparatus providing a plurality of services, each of said services utilizing at least one of said modules, said method comprising:

determining a service selected by a user selectively initializing from the power save state only said at least one of said modules corresponding to the service selected by the user.

15. The method of claim 14, wherein said services include at least one of copying, scanning, faxing, and printing.

16. The method of claim 14, wherein said modules include at least one of an image reading control unit, a communication control unit, an image forming control unit, and a network control unit.

17. A medium for recording therein an initializing program of an image forming apparatus provided with a plurality of modules having different functions, and power saving means for interrupting a power supply of at least one of the plurality of modules, or for reducing a power supply amount of the power supply, a service being provided by utilizing at least one of the plurality of modules, wherein such a module brought into a power saving state by said power saving means is sensed among the plurality of modules, the modules are caused to correspond to the services, and even when a portion of the modules corresponding to the services is brought into the power saving state by said power saving means, the services can be provided.

\* \* \* \* \*

UNITED STATES PATENT AND TRADEMARK OFFICE
CERTIFICATE OF CORRECTION

PATENT NO. : 5,974,284
DATED : October 26, 1999
INVENTORS : Yumi SATO et al.

It is certified that error appears in the above-identified patent and that said Letters Patent is hereby corrected as shown below:

Title page, Item [57], in the Abstract, line 3, "initialize" should read --initializes--.

Signed and Sealed this

Twenty-sixth Day of December, 2000

Attest:

Q. TODD DICKINSON

*Attesting Officer*               *Director of Patents and Trademarks*